United States Patent [19]

Roche

[11] Patent Number: 4,621,655

[45] Date of Patent: Nov. 11, 1986

[54] MARINE RISER FILL-UP VALVE

[75] Inventor: Joseph R. Roche, Houston, Tex.

[73] Assignee: Hydril Company, Los Angeles, Calif.

[21] Appl. No.: 707,760

[22] Filed: Mar. 4, 1985

[51] Int. Cl.$^4$ ............................................. F16K 17/36
[52] U.S. Cl. .................................. 137/81.2; 251/61.1;
251/342; 166/320; 166/350; 166/367
[58] Field of Search ................. 251/61.1, 63, 331, 342;
137/68 R, 71, 81.2; 166/317, 321, 324, 320, 350, 367

[56] References Cited

U.S. PATENT DOCUMENTS

| | | | |
|---|---|---|---|
| 1,767,201 | 6/1930 | Boynton | 251/61 |
| 3,312,238 | 4/1967 | Voit, Jr. | 251/61 |
| 3,559,734 | 2/1971 | Pitts | 137/71 |
| 3,779,263 | 12/1973 | Edwards et al. | 137/68 R |
| 3,981,360 | 9/1976 | Marathe | 166/317 |
| 4,294,284 | 10/1981 | Herd | 137/81.2 |
| 4,330,039 | 5/1982 | Vann et al. | 166/317 |
| 4,496,173 | 1/1985 | Roche et al. | 285/24 |

OTHER PUBLICATIONS

Inspection Coating Services, 1978/79, General Catalog, Vetco Services Group, vol. 4, World Oil.

*Primary Examiner*—A. Michael Chambers
*Attorney, Agent, or Firm*—Dodge, Bush & Moseley

[57] ABSTRACT

A marine riser safety valve is disclosed which, when placed in series with a deep water marine riser string, prevents collapse of riser pipe when inadvertent gas influx replaces the drilling fluid column. A cylindrical body is provided having a depression formed therein with at least one diaphragm port from the central bore of the body through the wall of the depression. A valve port is provided axially from the depression. A cylindrical member including a cylindrical diaphragm and a valve sleeve are joined end-to-end. The cylindrical member is disposed about the exterior of the body with the elastomeric diaphragm covering the depression and the valve sleeve covering the valve port. When a differential pressure develops across the wall of the diaphragm of a predetermined threshold, the diaphragm constricts into the body depression and moves the valve sleeve axially, opening the valve port to permit sea water influx. An outer skirt is provided to prevent outward ballooning of the diaphragm when bore pressure is greater than the surrounding sea water pressure.

12 Claims, 3 Drawing Figures

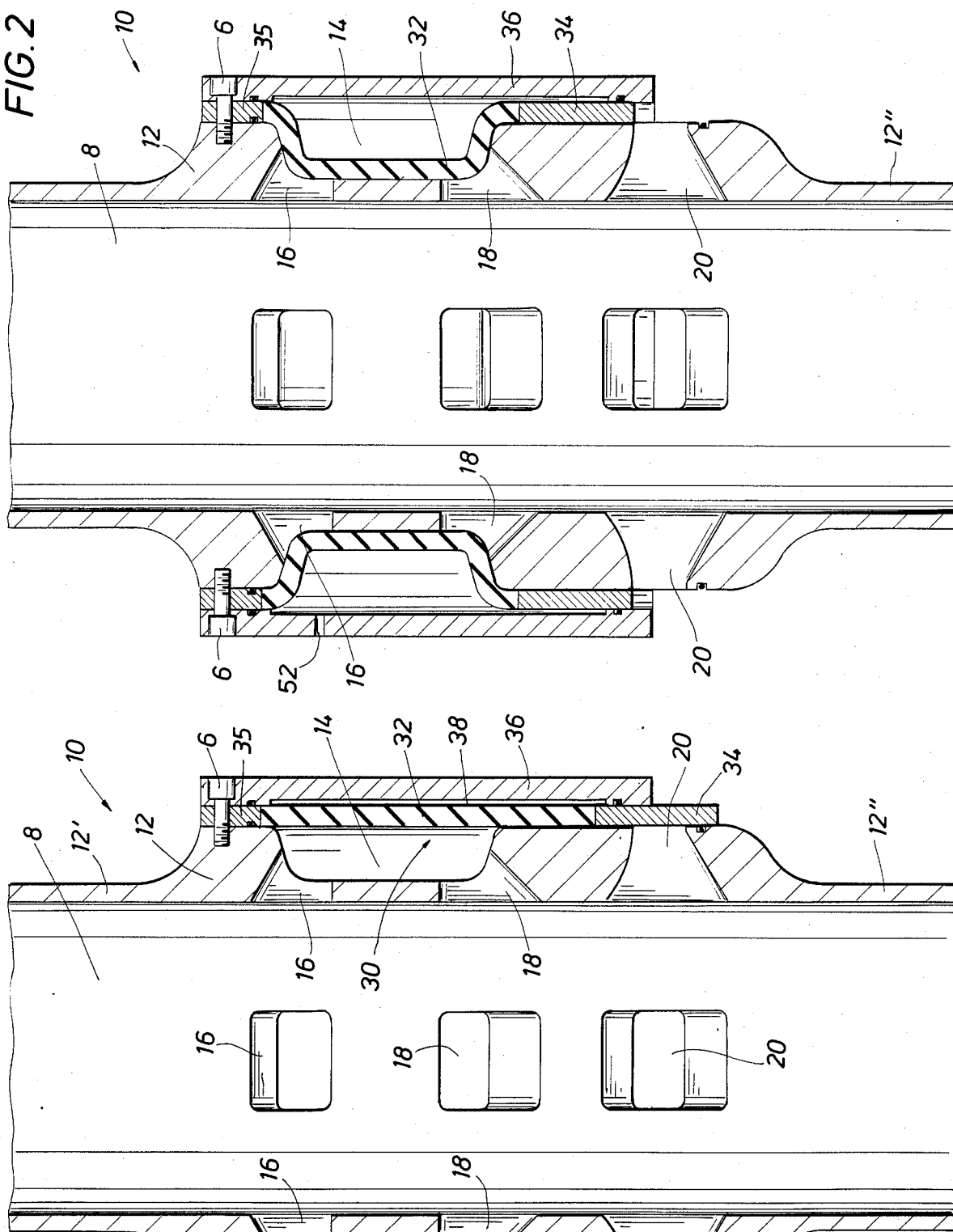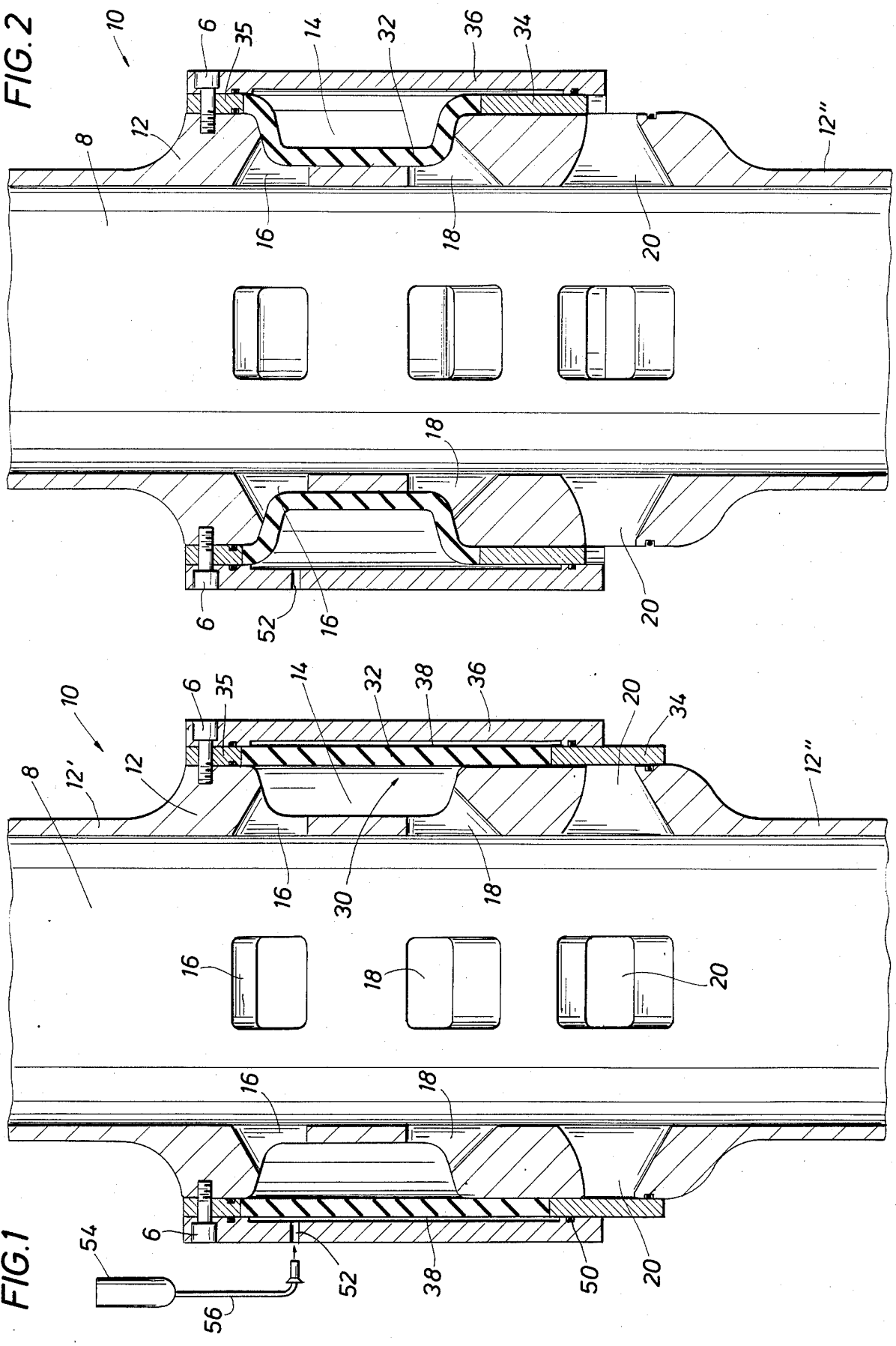

MARINE RISER FILL-UP VALVE

BACKGROUND OF THE INVENTION

1. Field of the Invention

This invention relates to a marine riser safety valve which is also known as a marine riser fill-up valve. More specifically, a marine riser fill-up valve prevents collapse of a riser if the level of drilling fluid suddenly drops because of loss of circulation or displacement of the mud column in the riser by formation gas. Still more specifically, the valve, placed in the riser string, is intended to sense the difference between the sea water pressure at the depth in which the valve is placed and the drilling fluid pressure in the interior of the valve (riser). Upon actuation of the valve, sea water is allowed to enter the interior of the riser thereby preventing riser collapse due to the high pressure hydrostatic head of the sea water on the exterior of the riser and a loss of sufficient hydrostatic head of drilling fluid in the riser.

2. Description of the Prior Art

A prior art marine riser fill-up valve is described at page of 6857 of the composite catalog of oil field equipment and services, 1978-79 version, Volume 4. The riser fill-up valve described there is manufactured by the Vetco Company and includes a sensing valve which senses differential pressure between the outside of the body of the valve and its interior bore. The valve hydraulically actuates a sliding port cover to uncover fill-up ports in the event of a sudden differential pressure between the outside of the valve and the interior bore. The riser fill-up valve described above has a disadvantage in that it requires complex hydraulic control circuits to assure its effective automatic operation. Also the pressure sensor may be actuated by a relatively short time interval of a differential pressure condition as may happen during a swabbing operation of the riser. In addition, the small sensing chamber on the pressure sensor may readily become fouled with drilling mud or cement. Another disadvantage of the prior art riser fill-up valve described above is that it is costly to manufacture, has complex mechanisms to make it work and has too much inertia to overcome when cycling of the valve is required.

3. Identification of Objects of the Invention

It is an object of the invention to be described below to provide a marine riser fill-up valve which is of simple construction and affords automatic operation with only a minimum of opportunity for malfunction.

It is another object of the invention to provide a marine riser fill-up valve which is less massive than the prior art riser fill-up valves and is more economical to manufacture.

It is another object of the invention to provide manual override controls for the riser fill-up valve which will enable the valve to be opened or closed on command of an operator.

It is another object of the invention to provide an automatic riser fill-up valve which can be used as a riser dump valve by operating manual controls.

It is another object of the invention to provide a pressure differential sensor which automatically actively actuates the valve, and if actuation somehow is prevented, will rupture before the pipe collapses thereby preventing collapse of the riser itself.

It is another object of the invention to provide a marine riser fill-up valve which can be pressure tested for operability before installation in a marine riser string without the need for a pressure tank.

It is another object of the invention to provide a marine riser fill-up valve which is less sensitive to mud plugging of fill-up ports because of the action of the pressure differential sensor itself and the large volume of the mud chamber and its capacity to drain readily.

SUMMARY OF THE INVENTION

The above identified objects of the invention as well as other features and advantages are included in a marine riser fill-up valve adapted for connection in an offshore riser string which extends through the sea between a surface drilling rig and a sea floor disposed blowout preventer stack. The valve includes a cylindrical body having a bore therethrough for communication of drilling fluid through the riser string. The cylindrical body has an outwardly facing annular depression formed in a first section of it and at least one valve port formed in a second section of the body.

At least one diaphragm port is formed in the wall of the body between the bore and the annular depression. A cylindrical member of series connected coaxial spools is provided about the exterior of the cylindrical body. The spools include a cylindrical diaphragm which is radially deformable between a relaxed state and a deformed state and has first and second ends. A valve spool is joined to the second end of the valve spool.

The cylindrical diaphragm is joined at its first end to a top ring which is fastened to the cylindrical body. The cylindrical diaphragm in its relaxed state operably covers the annular depression in the body and the joined valve spool operably covers the valve port of the body. In response to greater sea water pressure on its outer side with respect to bore fluid pressure via the diaphragm port on its inner side, the cylindrical diaphragm moves to a deformed state by deforming radially inwardly into the annular depression operably causing the valve spool to uncover the valve port.

The valve further advantageously comprises a cylindrical support skirt disposed coaxially about the cylindrical diaphragm. The skirt is fastened to the cylindrical body and has means for allowing sea water pressure to communicate with the outer side of the cylindrical diaphragm. The skirt operably prevents outwardly radial deformation of the cylindrical diaphragm when fluid pressure in the bore of the valve is greater than the surrounding sea water pressure.

The valve preferably includes at least one upper and one lower diaphragm port between the bore and the annular depression. Hydraulic means are provided for axially moving the cylindrical member thereby opening or closing the valve port on command.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIG. 1 is a cross-section of the marine riser fill-up valve according to the invention and shows the valve in a closed state;

FIG. 2 illustrates a cross-section valve of the valve after a differential pressure condition has been sensed and the valve has been opened.

DESCRIPTION OF THE INVENTION

Figure 3:
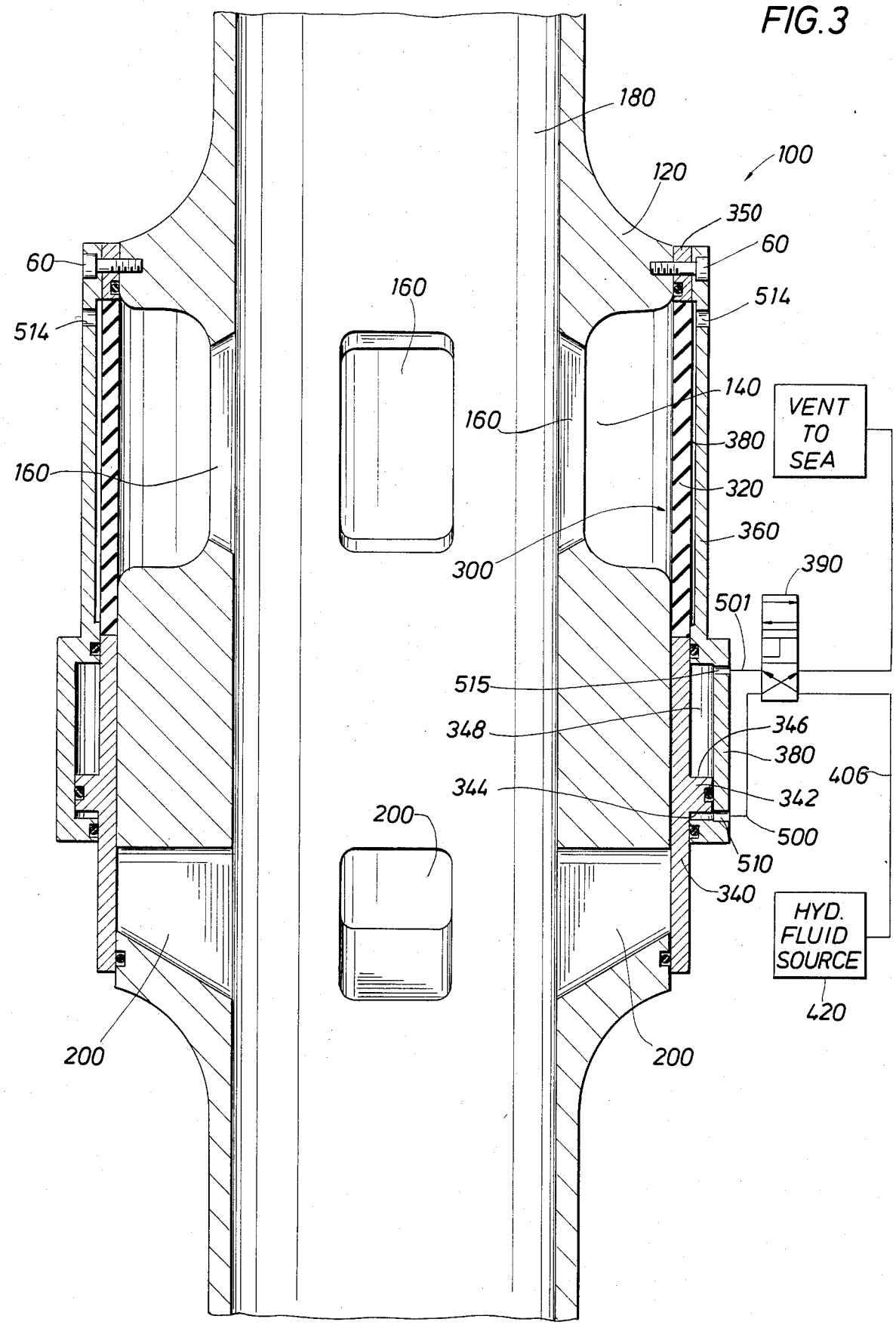
FIG. 3 shows an alternative embodiment of the invention in a cross-sectional view and further illustrates the provision of a hydraulic circuit and piston arrangement whereby the valve may be opened or closed on command by an operator.

FIG. 1 illustrates in a cross section view a marine riser fill-up valve according to the invention. Marine riser fill-up valve 10 preferably includes a cylindrical body 12 having an upper extention 12' and a lower extension 12'. The body extentions 12' and 12" may be connected in a marine riser string by means of riser couplings which are known in the art. A preferred means to couple the marine riser fill-up valve 10 to a riser string is with a riser coupling described in U.S. Pat. No. 4,496,173 which is assigned to the assignee of this application and is incorporated herein for all purposes.

The body 12 includes an outwardly facing annular depression 14 formed in its wall. At least one diaphragm port, but preferably two diaphragm ports including an upper diaphragm port 16, and and a lower diaphragm port 18, are provided between the central bore 8 of the valve and the annular depression 14. In a lower section of the valve, a valve port 20 extends through the wall of the body 12 to the interior bore 8. The ports 16, 18 are arranged as a plurality of windows or passages about the circumference of the body 12 and communicate the bore with the annular depression 14. The ports 20 are similarly arranged to communicate the bore 8 with the sea when the valve is open.

A cylindrical member 30 is provided about the exterior of the body 12 and covers the annular depression 14 and the valve port 20 in its relaxed or closed state. The cylindrical member comprises a cylindrical diaphragm 32 joined axially at one end to a valve spool 34 and at its other end to a top ring 35. The top ring 35 is connected to the body 12 for example by means of bolts 6.

The cylindrical diaphragm 32 is preferably radially deformable by a difference in pressure on its exterior side and its interior side but is not axially extendable. In other words, the deformation of the cylindrical diaphragm is solely in the radially constrictive direction. The cylindrical diaphragm 32 is joined to the valve spool 34 and to the top ring 35 by bonding, fusing, molding or mechanically connecting so as to create an integral radially sealed cylindrical member 30 of its three parts: the cylindrical diaphragm 32, the top ring 35 and the valve spool 34. Axially arranged fibers or wires are embedded in the cylindrical diaphragm 32 and are embedded in the valve spool 34 in the top ring 35. Such fibers or wires effectively prevent the axial extension or stretching of the cylindrical member 30.

The cylindrical diaphragm 32 is constructed to have a stiffness which must be overcome by a pressure differential across its wall to cause it to deform. The spool 32 requires that the sea water pressure $P_S$ to be greater than the bore pressure $P_b$ plus a pressure equivalent constant C before substantial deformation of spool 32 takes place. In other words, the condition, $P_S > P_b + C$ must exist before deformation of spool 32 and opening of the valve begins. The inertia of the diaphragm prevents inadvertent opening of the valve due to a short differential pressure transient caused, for example by the swabbing effect in the riser when a drill bit passes through the valve. Another feature of the cylindrical diaphragm 32 is that it is constructed of elastomeric type material which can rupture if the valve spool 34 should accidentally be prevented from moving axially thereby preventing pipe collapse.

FIG. 2 illustrates the operation of the valve when a pressure differential exists between the outside of the valve 10 and the interior of the bore 8. The cylindrical diaphragm 32 deforms radially inwardly and in so doing, causes the valve spool 34 to move axially upwardly thereby uncovering the valve port 20. Thus, the valve operates automatically on sensing a predetermined pressure differential between the exterior sea water and the pressure of the drilling fluid internal to the bore 8.

As illustrated in FIG. 1 and 2 when the mud column pressure head in the bore 8 is at a safe value, the bore 8 of the riser string is isolated from the hydrostatic head of the sea exterior to the valve. When the differential pressure across the valve body 12 at the depth in which it is placed in the riser string is of a predetermined threshold, the elastomeric diaphragm or spool 32 constricts causing the valve spool 34 to move axially upwardly, thereby opening the valve port 20 to permit sea water influx. Thus a collapse of the riser is avoided.

A support skirt 36 is preferably provided about the exterior of the cylindrical diaphragm 32 and is fastened to the body 12 for example by the same threaded bolts 6 that connect the top ring 35 to the body 12. An annular space 38 is provided between the support skirt and the cylindrical diaphragm to insure that the sea water pressure may be sensed by the outer side of the cylindrical diaphragm 32. The support skirt 36 functions to prevent outward ballooning of the cylindrical diaphragm 32 when the pressure inside of the bore 8 exceeds that of the sea water. Additionally as shown in FIG. 2, when the diphragm spool 32 deflects inwardly causing the valve spool 34 to move upwardly, the valve skirt 36 aids in axially guiding the valve spool 34 upwardly. There has been provided a marine riser fill-up valve which automatically opens a valve port upon the sensing of differential pressure of a predetermined value between the sea water head pressure and the drilling fluid head pressure in the interior of the bore 8.

The cylindrical diaphragm 32 is a deformable means disposed about the outside of the body which covers the depression 14, with its integral valve spool 34 covering the valve port. In response to a pressure differential of a predetermined amount between the exterior of the body and the interior of the body, the deformable means moves radially inwardly into the depression 14 while simultaneously causing a connected valve sleeve 34 to move axially to uncover the valve port.

The valve 10 optionally includes a seal 50 between the interior of the skirt 36 and the exterior of the valve sleeve or spool 34 where the spool 34 is in the closed position. A port 52 is provided through the wall of skirt 36 through which sea water is applied in operation of the valve. For testing of the valve, high pressure fluid (preferably water) from source 54 may be applied via conduit 56 for pressurizing annular space 38 to test the operability of cylindrical diaphragm 32. Such testing can be done without the complications of immersing the valve in a test vessel or submerging the valve while maintaining low pressure in its bore.

The marine riser fill-up valve 10 of the invention has the advantage of being extremely simple and operates automatically on the sensing of differential pressure. It therefore affords few opportunities for malfunction. The valve is relatively less massive than prior marine riser fill-up valves and for that reason alone is more economical to manfacture.

Another advantage of the marine riser fill-up valve 10 is that if the cylindricl diaphragm 32 were to become jammed for some reason, or the valve spool 34 were to become jammed, the cylindrical diaphragm 32 would burst or rupture prior to the riser pipe collapsing thereby achieving its primary purpose of being a safety valve to protect the physical integrity of the marine riser string to which it is connected.

Another advantage of this invention is that the elastomeric diaphragm or spool 32 dampens transient pressure pulses and therefore when a momentary spike of differential pressure, caused for example by swabbing the bore 8, the valve does not open prematurely. Another advantage of the invention is that because the cylindrical diaphragm 32 moves inwardly and outwardly (such movement could be characterized as "breathing") mud plugging in the annular depression 14 is minimized due to the mechanical motion of the cylindrical diaphragm 32.

Other arrangements of the parts of the safety valve illustrated in FIGS. 1 and 2 are, of course, possible. For example, the valve spool could be arranged to uncover a valve port above an annular depression 14. Likewise, the cylindrical diaphragm need not necessarily be a cylinder at all but could possibly be a rectangular member covering a rectangular angular depression and the valve cylinder could be a rectangular shaped member covering a hole or port 20. Likewise, the elastomeric member or diaphragm 32 could move circumferentially on deformation into a depression in the wall 20 whereby the valve spool 34 would be moved circumferentially out of covering relationship with a hole or port in the body.

Turning now to FIG. 3, an embodiment of the invention is illustrated including hydraulic control for opening or closing the valve 100 on command. This embodiment of the invention includes a cylindrical body 120 having an outwardly facing depression 140 in its wall and having a diaphragm port 160 provided between the bore 180 and the depression 140. A valve port 200 is provided in a axially lower part of the body 120. A cylindrical member 300 comprising a cylindrical diaphragm 320 joined with a valve spool 340 is provided about the outside of the body 120.

In its relaxed state, cylindrical diaphragm or diaphragm 320 covers the depression 140 and the lower part of the valve spool 340 covers the valve port 200. A support skirt 360 is provided about the exterior of the cylindrical member 300 and it as well as a top ring 350 of the cylindrical diaphragm 320 are fastened to the body 120 for example by means of threaded bolts 60. The lower end of the support skirt 360 has an outward extension 380 which corporates with the outward extension 342 provided on the valve spool 340 to create a piston chamber 348 between valve spool 340 and the outward extension 380 of the support skirt 360. A conduit 500 extends from a lower port 510 in the outward extension 380 of skirt 360 to a controller 390. Likewise, a conduit 501 extends to an upper port 515 through the outward extension 380 of skirt 360.

The controller 390 has three positions which may be moved on demand of an operator. The middle position of the controller 390 causes sea water to be applied to port 515 and the valve 100 operates in a substantially similar manner to that of valve 10 illustrated in FIGS. 1 and 2. That is, sea water is applied to the piston chamber 348 and is also applied to the exterior side of the cylindrical diaphragm 320 via port 514 in skirt 360 to annular space 380. When the controller is moved to the manual closed position, hydraulic control fluid from source 420 via conduit 406 is applied to conduit 501 to port 515 thereby providing hydraulic pressure against piston surface 346 driving valve spool 340 downwardly and thereby closing valve port 200.

When the controller 390 is in the manual open position, hydraulic control fluid is applied from source 420 via conduit 406 to conduit 500 and port 510 thereby applying pressurized hydraulic fluid to piston surface 344 and driving the valve spool 340 upwardly. When the valve spool 340 is driven upwardly, the valve port 200 is uncovered and the cylindrical diaphragm 320 is deformed inwardly into the depression 140.

It is seen by the apparatus disclosed in FIG. 3 that the marine riser fill-up valve 100 according to the invention may also be used as a dump valve in the marine riser string whereby an operator may open the valve and allow drilling cuttings to discharge via valve port 200.

Various modifications and alterations in the described structures will be apparent to those skilled in the art of the foregoing description which does not depart from the spirit of the invention. For this reason these changes are desired to be included in the appended claims which recite the only limitations to the present invention in the descriptive manner which is employed for setting forth the embodiments and is to be interpreted as illustrative and not limitative.

What is claimed is:

1. A marine riser fill-up valve adapted for connection in an offshore riser string through the sea comprising,
   a cylindrical body having a bore therethrough for communication of drilling fluid through said riser string and having an outwardly facing annular depression formed in a first section of said body and at least one valve port formed in a second section of said body,
   at least one diaphragm port formed in the wall of said body between said bore and said annular depression, and
   a cylindrical member of series-connected coaxial spools including,
      a cylindrical diaphragm radialy deformable between a relaxed state and a deformed state and having first and second ends,
      a valve spool joined at said second end of said cylindrical diphragm, and
      a top ring joined at said first end of said cylindrical diaphragm, said top ring being fastened at its first end to said cylindrical body,
   said cylindrical diaphragm in its relaxed state operably covering said annular depression in said body and said joined valve spool operably covering said valve port of said cylindrical body,
   said cylindrical diaphragm, in response to greater sea water pressure on its outer side with respect to bore fluid pressure via said diaphragm port on its inner side, moving to a deformed state by constricting radially into said annular depression operably causing said valve spool to uncover said valve port.

2. The valve of claim 1 further comprising,
   a cylindrical support skirt disposed coaxially about said cylindrical diaphragm, said skirt fastened to said cylindrical body, said skirt having means for allowing sea water pressure to communicate with the outer side of said cylindrical diaphragm, said skirt operably preventing outwardly radial deformation of said cylindrical diaphragm when fluid pressure in said bore of said valve is greater than surrounding sea water pressure.

3. The valve spool of claim 2 further comprising, means for sealing said skirt with respect to said cylindrical member of series-connected coaxial spools to create a sealed annular space exterior of said cylindrical diaphragm, and means for pressurizing said annular space operably testing the operation of said valve.

4. The valve of claim 1 further including at least one upper and at least one lower diaphragm port between said bore and said annular depression.

5. The valve of claim 1 further including hydraulic means for axially moving said cylindrical member thereby opening or closing said valve port.

6. A marine riser safety valve adapted for connection in an offshore riser string through the sea comprising, a body having a bore therethrough forming a vertical flow path for drilling fluid through said riser string and having an outwardly facing depression formed in a first section of said body and at least one valve port formed in a second section of said body, at least one diaphragm port formed in the wall of said body between said bore and said depression, and deformable means disposed about the outside of said body to cover said depression and said valve port, and responsive to a pressure differential of a predetermined amount between the exterior of the deformable means and the interior bore of the body, for deforming radially inwardly into said depression while simultaneously moving to uncover said valve port.

7. The safety valve of claim 6 wherein said body is cylindrical in shape and said deformable means includes, a cylindrical diaphragm and a valve spool joined axially end to end.

8. The safety valve of claim 7 wherein said cylindrical diaphragm is radially deformable, and upon constricting radially, causes said valve spool to move axially.

9. The valve of claim 6 further comprising skirt means disposed about said deformable means and fastened to said body for preventing outwardly radial deformation of said cylindrical diaphragm when fluid pressure in said bore is greater than surrounding sea water pressure.

10. The valve of claim 6 further including means for moving said deformable means on command to uncover or cover said valve port.

11. A cylindrical member adaptable for use in a marine riser safety valve, the valve adapted for connection in an offshore riser string having a body having a bore there through forming a vertical flow path for drilling fluid through the riser string and having an outwardly facing depression formed in a first section of the body and at least one valve port formed in a second section of the body, a diaphragm port formed in the wall of the body between the bore and the depression, the cylindrical member comprising, a cylindrical diaphragm disposed about the outside of the body radially deformable between a relaxed state and a deformed state, and a cylindrical valve spool joined at one end to said cylindrical diaphragm, said cylindrical diaphragm adapted to move from said relaxed state, where said valve spool covers valve port in said safety valve, to said deformed state in radially inwardly into the depression response to a differential pressure between sea water on its outside and drilling fluid on the inside of said safety valve, where said valve spool simultaneously uncovers said valve port.

12. The cylindrical member of claim 11 further comprising a top ring joined at the other end of said cylindrical diaphragm.

* * * * *